Figure 1:
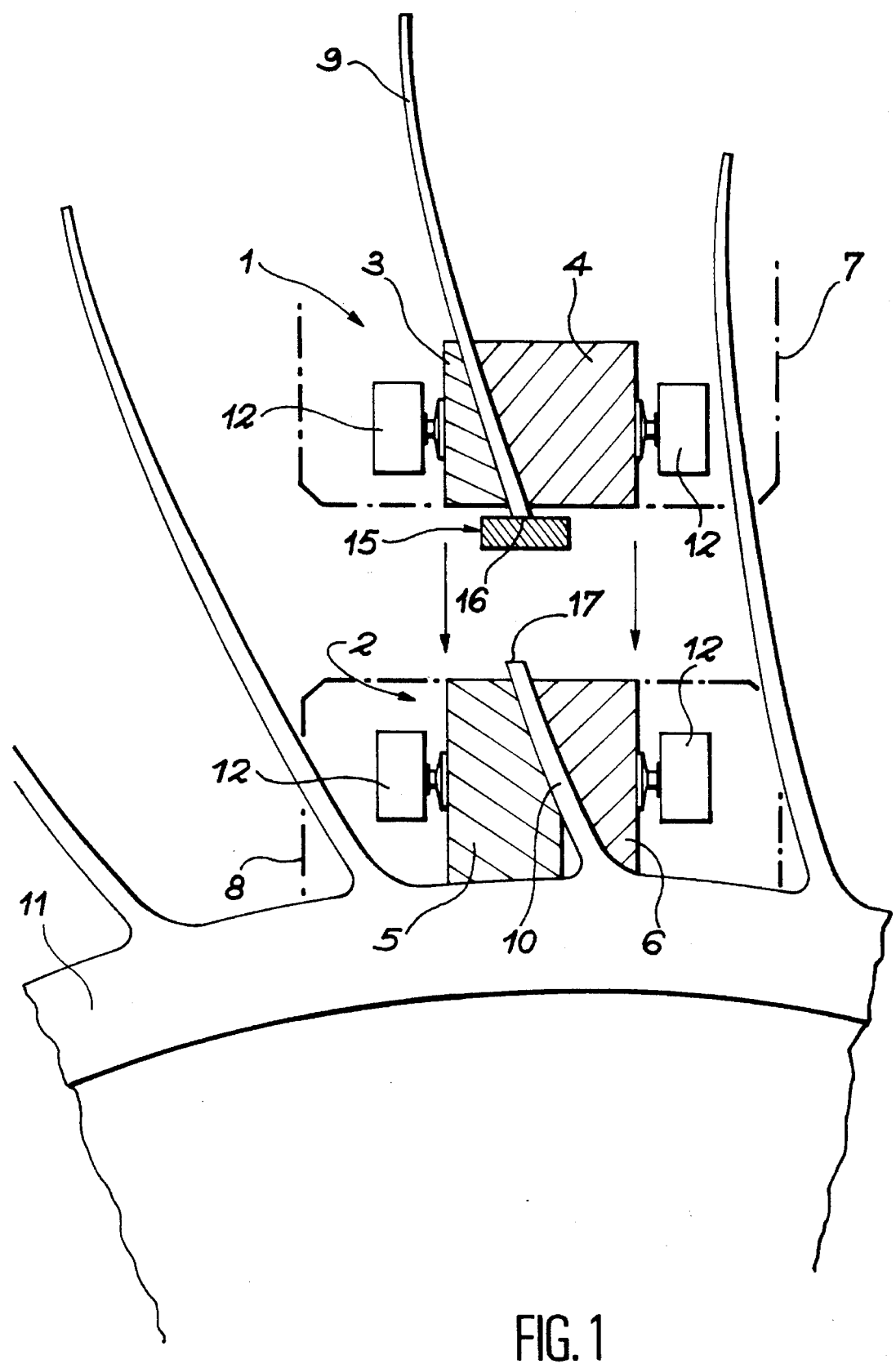

United States Patent [19]
Collot et al.

[11] Patent Number: 5,551,623
[45] Date of Patent: Sep. 3, 1996

[54] PROCESS FOR WELDING TWO BLADE PARTS

[75] Inventors: André C. F. Collot, Mennecy; Jean-Pierre Ferte, Corbeil Essonnes; Roger Jolly, Cesson, all of France

[73] Assignee: Societe Nationale d'Etude et de Construction de Moteurs d'Aviation "SNECMA", Paris, France

[21] Appl. No.: 390,317

[22] Filed: Feb. 17, 1995

[30] Foreign Application Priority Data

Feb. 23, 1994 [FR] France ................................ 94 02026

[51] Int. Cl.⁶ .................................................... B23K 20/12
[52] U.S. Cl. ........................ 228/112.1; 228/119; 228/177; 228/212; 228/265
[58] Field of Search ................................ 228/112.1, 119, 228/212, 265, 177, 2.1, 44.3; 29/889.21, 402.13; 416/213 R; 219/161; 156/580, 73.5

[56] References Cited

U.S. PATENT DOCUMENTS

| | | | |
|---|---|---|---|
| 3,768,147 | 10/1973 | Berry et al. | 228/2.1 |
| 5,031,288 | 7/1991 | Sadler | 228/112.1 |
| 5,188,275 | 2/1993 | Daines | 228/2.1 |
| 5,486,262 | 1/1996 | Searle | 228/2.1 |
| 5,492,581 | 2/1996 | Searle | 228/44.3 |

FOREIGN PATENT DOCUMENTS

| | | |
|---|---|---|
| 0145897 | 6/1985 | European Pat. Off. . |
| 0486755 | 5/1992 | European Pat. Off. . |
| 2237758 | 5/1991 | United Kingdom . |

OTHER PUBLICATIONS

Patent Abstracts of Japan, vol. 6, No. 242 (M–175), Nov. 30, 1982, JP–57–139485, Aug. 28, 1982.
Patent Abstracts of Japan, vol. 7, No. 283 (M–263), Dec. 16, 1983, JP–58–159988, Sep. 22, 1983.

*Primary Examiner*—Samuel M. Heinrich
*Attorney, Agent, or Firm*—Oblon, Spivak, McClelland, Maier & Neustadt, P.C.

[57] ABSTRACT

Process for welding two blade parts (9, 10) by a means such as a linear friction welding machine, in which a collar or flange (15) of material to be sacrificed is placed between the contact surfaces (16) or around the latter in order to increase the heat produced by the friction at the leading and trailing edges of the blade. As a result of this arrangement it is possible to start with two blade parts (9, 10) having the dimensions of the finished product, possibly with the exception of the area around the contact surfaces, so that the final machining is very significantly reduced.

13 Claims, 4 Drawing Sheets

1

PROCESS FOR WELDING TWO BLADE PARTS

DESCRIPTION

The invention relates to a process for welding two blade parts and can in particular be used for the construction of what are called monobloc bladed disks (MBD), whereof the actual disk is produced by moulding or forging and machining and the blade parts known as sleeves and which are connected thereto and separately the remainder of the blades. These blade remainders are then welded to the sleeves by a process which can be a linear friction welding process in order to obtain the finished product. However, the quality of the weld is not generally adequate for the leading and trailing edges of the blades, because on the one hand the heating of the latter is well below that of the central part of the blade, due to the fact that the facing parts are alternately exposed to the air, and on the other hand the lateral material expulsion is very low as a result of the lower temperature and the locally reduced thickness. Finally, this exposure to the air leads to a risk of the metal being contaminated at these points by oxidation.

This disadvantage is conventionally obviated by constructing the sleeve and the complimentary part of the blade with an allowance and the assembly is brought to the dimensions of the end product after welding, which leads to certain disadvantages, the machining of such surfaces being difficult.

Even though this method is accepted for new parts, the repair acceptance criteria can prevent the metal reloading of the sleeve, which is at the dimensions of the end product.

The invention makes it possible to provide a correct or satisfactory weld of the blades, including the leading and trailing edges, by using two blade parts generally having their final shape, i.e. without any allowance, except in the immediate vicinity of the welding zone. In its most general form, it relates to a process for welding two blade parts, in which the blade parts are gripped between pairs of jaws and are contacted with one another on their surfaces to be welded by moving together said pairs of jaws, said jaws enabling the parts to be welded not to be deformed under the welding pressure, said process being characterized in that a flange is placed at the contact surfaces of the blade parts, at least at the leading and trailing edges of said surfaces. The flange or collar extends around the contact surfaces, either being intercalated between them, or flush with said surfaces and it then only extends around parts of the blades.

The flange does not form an integral part of the blade, but is instead joined thereto, which completely differentiates the invention from the known solution. The only machining required after welding is a deburring-trimming in order to detach the flange. In an embodiment, the flange is a plate positioned between the contact surfaces and it is destroyed during welding, due to the temperature rise resulting from the welding operation and the force exerted between the contact surfaces. It is possible that the plate will supply a small amount of filler to the weld, but this effect is not particularly sought and remains of a secondary nature compared with the need of obtaining a good weld. In another variant, the flange is subdivided into two parts respectively placed around the contact surfaces and flush with said surfaces, being retained by their edges on respective ledges of jaw pairs. The material of the flange then does not participate in the welding of the blade, but its thermal function remains.

It is possible to use linear friction welding, flash welding or forge and fusion welding, because the invention is performed in the same way.

The invention is described in greater detail hereinafter relative to non-limitative embodiments and with reference to the attached drawings, wherein show:

FIG. 1 A first embodiment of the invention.

FIGS. 2, 3, 4, 5 & 5A A second embodiment of the invention.

Figure 6:
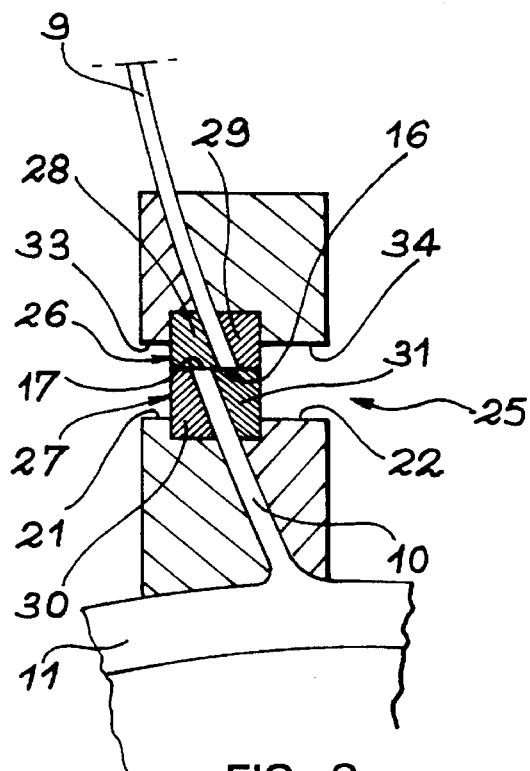
Figure 7:
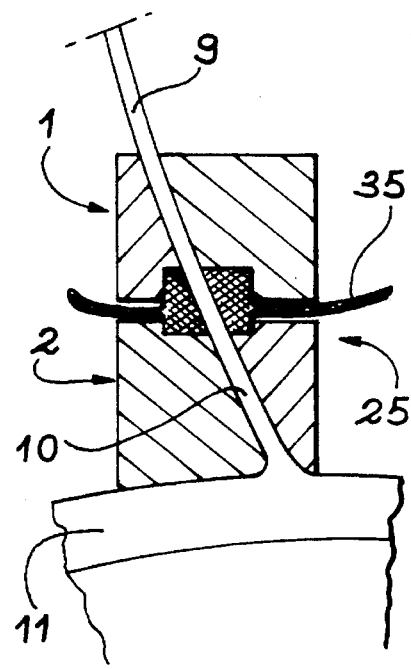

FIGS. 6 & 7 A third embodiment of the invention.

Figure 8:
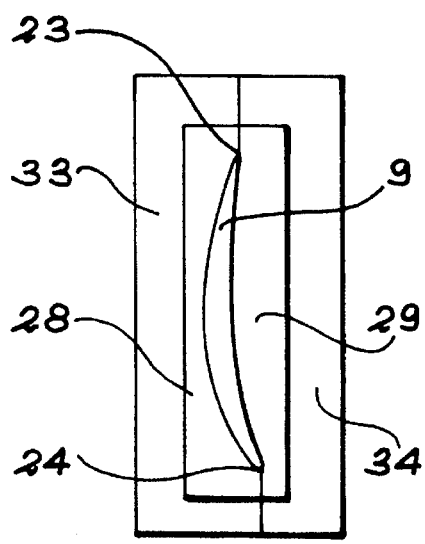
Figure 9:
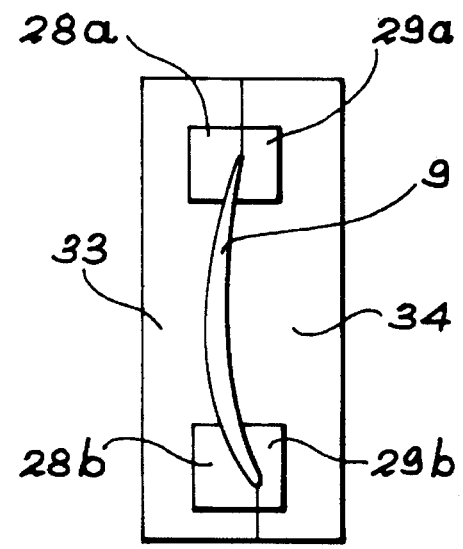
Figure 6:
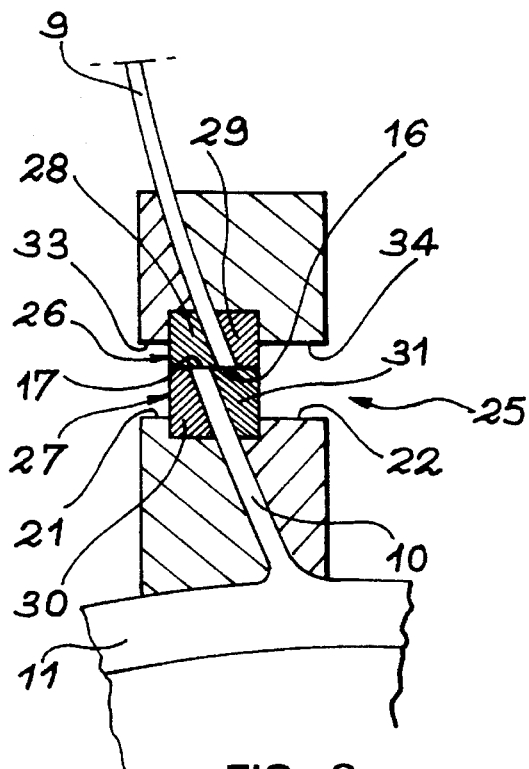
Figure 7:
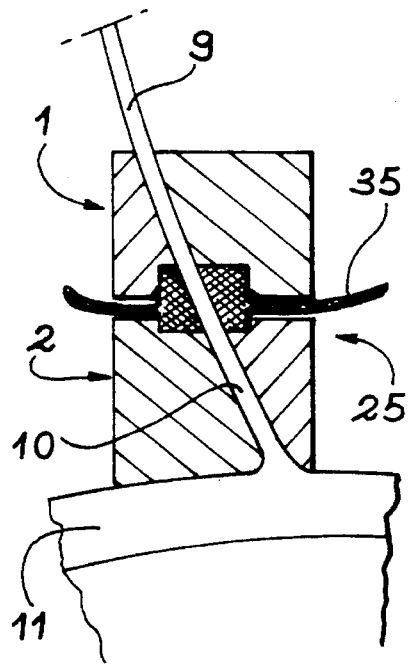
Figure 8:
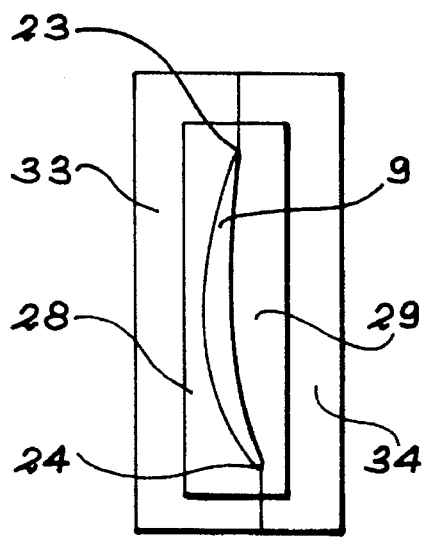
Figure 9:
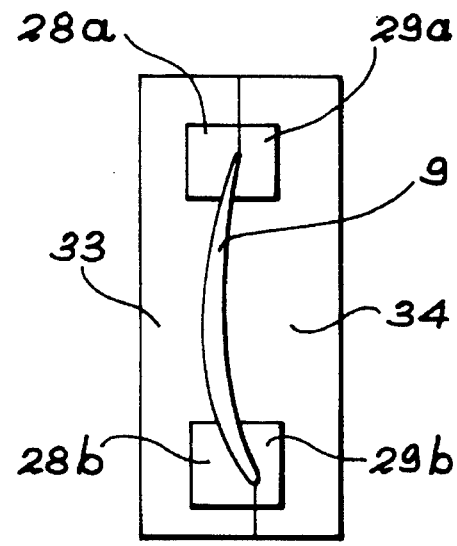

FIGS. 8, 9 and 10 Three types of flange.

The invention is more specifically described in conjunction with linear friction welding, but without significant modification can apply to other welding types. A linear friction welding machine incorporates, as can be seen in FIG. 1, two pairs of jaws 1 and 2, whereof the jaws, respectively 3, 4 and 5, 6 are manufactured with bearing surfaces shaped like the parts which they grip and joined to supports 7, 8 outlined by jacks 12 or similar means for moving them together. The supports 7 and 8 can be displaced with an alternating movement with respect to one another and moved together in order to produce with an adequate pressure the friction movement responsible for the heating and finally the welding. The pair of jaws 1 grips the end 9 of the blade to be welded and the other pair of jaws 2 grips the sleeve 10. The hub of the disk 11 is connected to the support 8 by not shown means. In the embodiment of FIG. 1, a flange-shaped, flat plate 15 is welded to the contact surface 16 of the blade end 9. The contact surface 17 of the sleeve 10 is free. The flange or collar 15 projects over the blade section in the thickness direction, as can be seen in the drawing and also projects in the width direction, so as to supply the material necessary for the heating of the leading and trailing edges and so as to limit the uncovering of the surfaces to be welded. The plate 15 is heated and deforms during the welding and the forging following the latter and its material is rejected from the two sides of the space between the jaw pairs 1 and 2. Finally, the end 9 and the blade sleeve 10 are joined by their contact surfaces 16, 17, without the material of the plate being significantly incorporated into the finished blade. It forms a burr which surrounds the contact surfaces 16 and 17 and which is then removed without performing any further blade machining, because the end 9 and the sleeve 10, in all the embodiments, have their final shape, except possibly over a small height close to the contact surfaces 16, 17 (represented under reference 19 in FIG. 4).

Figure 2:
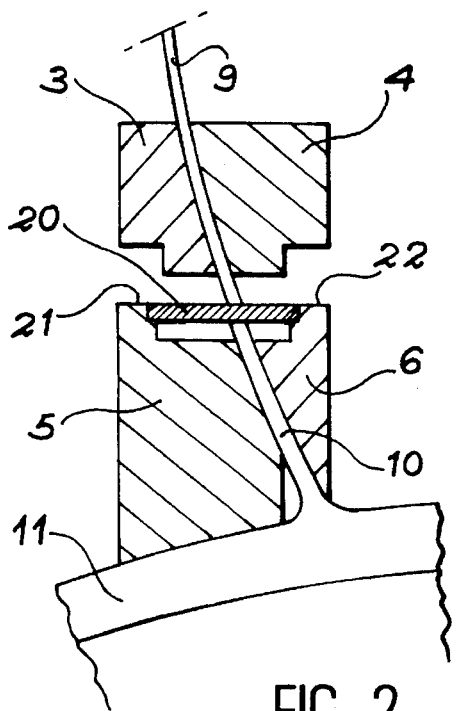
Figure 3:
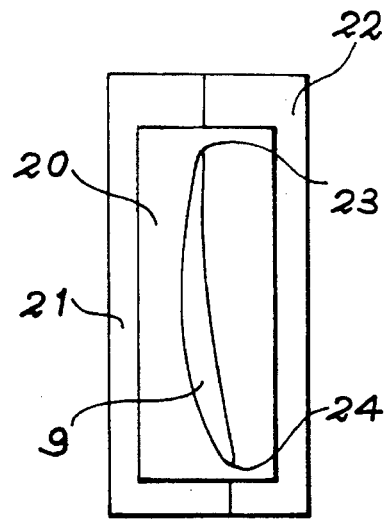
Figure 4:
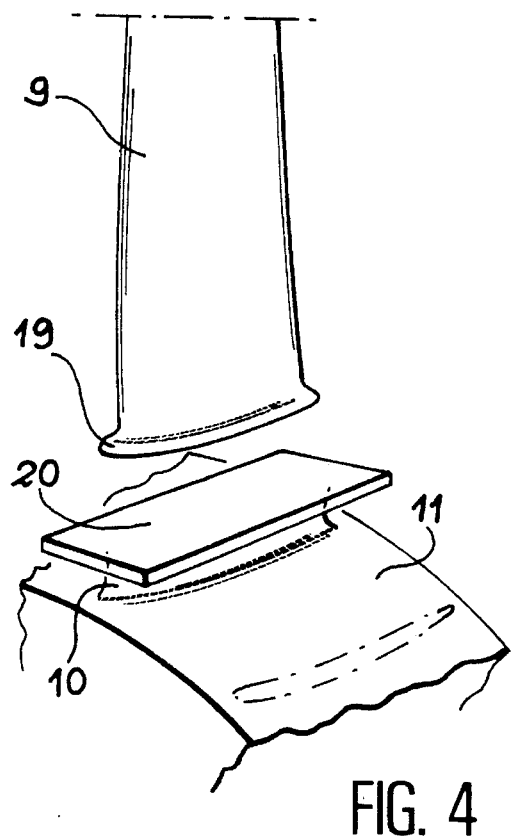
Figure 5:
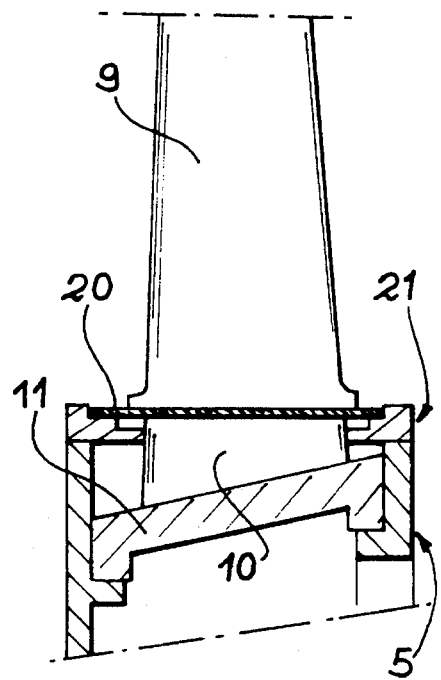

FIGS. 2 to 5, whereof FIG. 2 is a cross-section of the apparatus, FIG. 3 a plan view, FIG. 4 a perspective view and FIG. 5 a longitudinal sectional view, show a design in which the plate 15 integral with the end 9 is replaced by a plate 20 placed between the contact surfaces 16 and 17 and it is then necessary to secure it against the alternating movement of the jaw pairs 1 and 2 by holding it between the ledges 21, 22 of the jaws 5, 6 of the same pair. The ledges 21, 22 also have bearing surfaces for the correct positioning of the plate 20. These surfaces do not extend up to the sleeve 10, in order to prevent contact with the melted parts of the plate 20. In order to prevent the slightest movement, mainly in the longitudinal direction, of the plate with respect to the ledges 21, 22, a locking can be provided on a slope in the manner shown in FIG. 5A. A wedge 18 is placed between the plate 20 and the ledge 21 and its facing faces are bevelled in order to bear on the oblique faces of the wedge 18. The locking is ensured by a screw 38 engaged in a bracket 39 above the ledge 21 and connected thereto. The screw 38 weighs on the wedge 18 and lowers it onto the jaw 5, which prevents a reverse movement of the plate 20. A similar device exists for the other jaw 6 and the other ledge 22. The performance of the welding is the same as that shown in FIG.1. Thus, FIG. 3 shows that the plate 20 extends in width beyond the leading 23 and trailing 24 edges.

Further variants are described relative to FIGS. 6 and 7, which show the situation at the start and end of welding. On this occasion use is made of a collar or flange 25 formed from two parts 26, 27 associated respectively with the end 9 and the sleeve 10 of the blade. More specifically, the parts 26 and 27 of the flange 25 are placed around portions of said parts which are adjacent to the contact surfaces 16, 17 and are constituted in each case by pieces 28, 29 and 30, 31 respectively, touching a respective upper or lower face of the blade and mutually touching beyond the leading and trailing edges in the manner visible in FIGS. 6, 7 and 8. Moreover, the collar parts 26, 27 flush with the contact surfaces 16, 17 are retained in ledges 21, 22 and 33, 34 of the jaws 5, 6, 3 and 4 and are placed at the bottom of indentations defined by these ledges. The flange 25 is consequently completely held and becomes plastic during the welding process in such a way that the crushed material flows back and forms a burr 35 passing out from between the pairs of Jaws 1 and 2 at the end of the welding process, when the jaws have been stopped and the forging pressure has been eliminated in order to obtain a blade having the desired length. The pieces of the flange 25 are then welded together and to the blade, whereas they were joined to,the end 9 and to the sleeve 10 prior to welding without being fixed thereto, but a complete connection of the six elements has taken place during welding and heat conduction has been completely ensured. The pieces 28 to 31 can consist of sheet metal portions machined to the local profiles of the blades. A simple machining operation is sufficient to remove the burr 35 and the residue of the flange 25, as in the other embodiments, FIG. 8 shows the flange pieces 28, 29 extending from the leading edge 23 to the trailing edge 24 and beyond said edges, where they are joined but, as shown in FIG. 9, they need only be located in the vicinity of said edges, where the heat conduction must specifically be ensured and would be subdivided into two separate fragments 28a, 28b and 29a, 29b. The ledges 21, 22, 33 and 34 would then have an appropriate shape to prevent any movement during welding, as is e.g. shown in FIG. 5A.

The situation would be the same if the fragments 28a and 29a only constituted two joined parts of a single flange element 36 placed around the leading edge 23, as well as fragments 28b and 29b for another flange element 37 around the trailing edge 24, in the manner shown in FIG. 10.

We claim:

1. Process for welding two blade parts (9, 10), in which the blade parts are gripped between the jaw pairs (1, 2) and contacted with contact surfaces (16, 17) by moving together the jaw pairs, characterized in that a flange (15, 20, 25) is located at the contact surfaces of the blade parts at least at the leading and trailing edges (23, 24) of said surfaces (16, 17), the flange extending around the contact surfaces.

2. Welding process according to claim 1, characterized in that the flange is a plate (15, 20) located between the contact surfaces (16, 17).

3. Welding process according to claim 2, characterized in that the plate (15) is joined to one of the contact surfaces (16).

4. Welding process according to claim 2, characterized in that the plate (20) is placed on one of the contact surfaces (17) and its edges are held by a ledge (21, 22) of the jaw pair (2) associated with the blade part (10) having said contact surface (17).

5. Welding process according to claim 1, characterized in that the flange (25) is subdivided into two parts (26, 27) respectively placed around the contact surfaces (16, 17), flush with said surfaces and held on the edges by the respective ledges (21, 22, 33, 34) of the jaw pairs.

6. Welding process according to claim 5, characterized in that the flange parts are subdivided into pieces (27, 28) each joined to one face of the blade parts between the leading and trailing edges (23, 24) and joined to one another beyond the leading and trailing edges.

7. Welding process according to claim 5, characterized in that the flange parts are continuous between the leading and trailing edges.

8. Welding process according to claim 5, characterized in that the flange parts are subdivided into two separate fragments (28a, 29a, 28b, 29b), whereof one is located on the trailing edge and the other on the leading edge.

9. Welding process according to claim 5, characterized in that the parts are subdivided into two pieces (36, 37), whereof one surrounds the leading edge (23) and the other surrounds the trailing edge (24).

10. Welding process according to claim 1, characterized in that the flange is held by at least one of the jaw pairs (1, 2) gripping the blade parts.

11. Welding process according to claim 1, characterized in that the welding is a linear friction welding.

12. Welding process according to claim 1, characterized in that the welding is a flash welding.

13. Welding process according to claim 1, characterized in that the welding is a forge and fusion welding.

* * * * *